Figure 1:
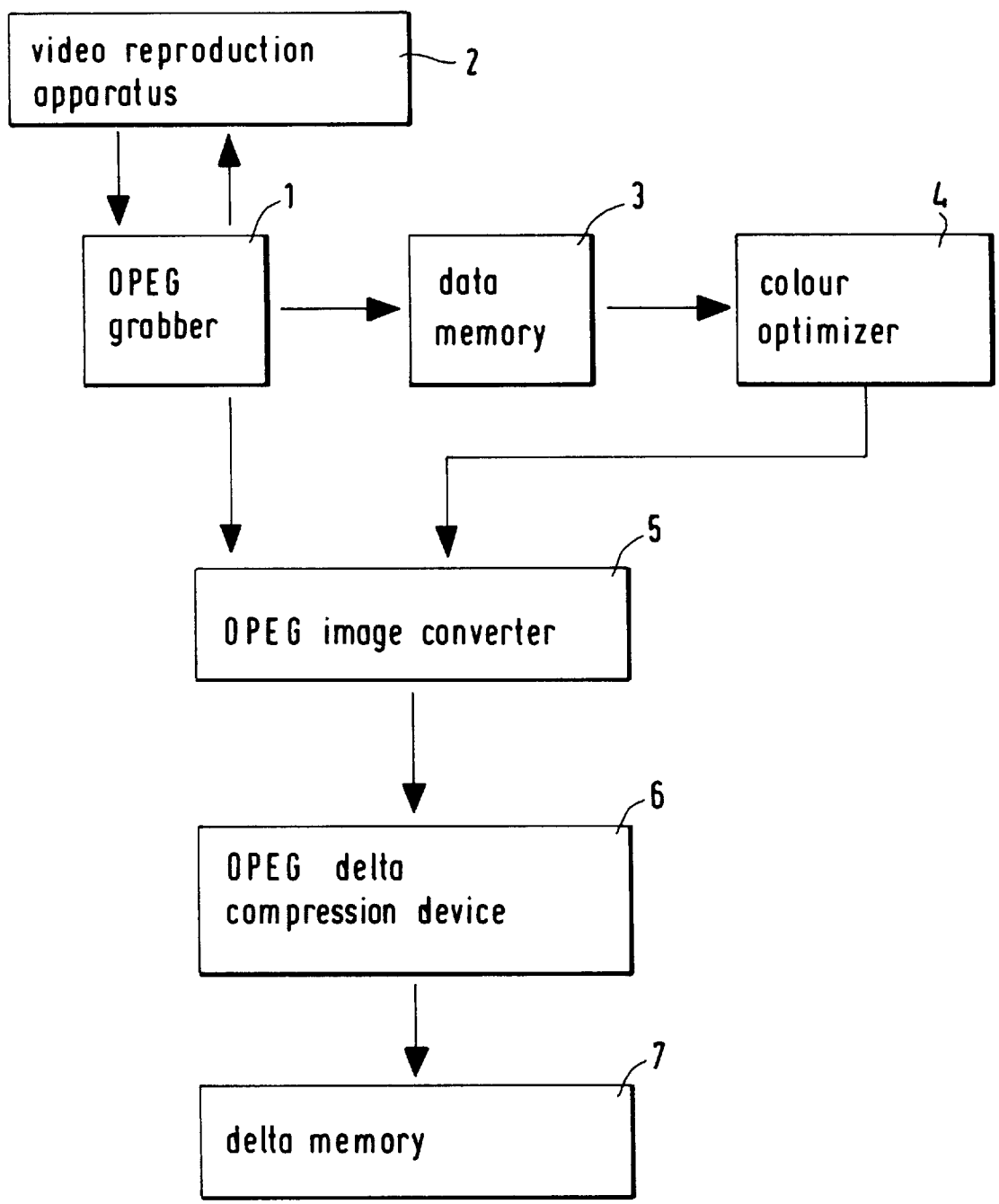

United States Patent

Hoffmann et al.

[11] Patent Number: 5,825,918
[45] Date of Patent: Oct. 20, 1998

[54] METHOD AND APPARATUS FOR GENERATING AND REPRODUCING OF COMPRESSED COLORED VIDEO SCENES

[75] Inventors: Peter Hoffmann, Dresden; Gerald Knabe, Korschenbroich, both of Germany

[73] Assignee: Q-Team Dr. Knabe Gesellschaft für Informations-und Qualifikations-systeme mbH, Korschenbroich, Germany

[21] Appl. No.: 693,123
[22] PCT Filed: Feb. 17, 1995
[86] PCT No.: PCT/EP95/00590
§ 371 Date: Nov. 5, 1996
§ 102(e) Date: Nov. 5, 1996
[87] PCT Pub. No.: WO95/22869
PCT Pub. Date: Aug. 24, 1995

[30] Foreign Application Priority Data

Feb. 18, 1994 [DE] Germany ............ 44 05 217.0
Jun. 21, 1994 [DE] Germany ............ 44 21 657.2

[51] Int. Cl.⁶ .................. G06K 9/00; G06K 9/36
[52] U.S. Cl. ........................... 382/166; 382/225
[58] Field of Search ........................... 382/162, 166, 382/224, 225, 253; 345/199, 153, 155; 395/431

[56] References Cited

U.S. PATENT DOCUMENTS

| | | |
|---|---|---|
| 4,597,005 | 6/1986 | Baleshta et al. . |
| 4,849,807 | 7/1989 | Music et al. . |
| 4,987,480 | 1/1991 | Lippman et al. . |
| 5,089,884 | 2/1992 | Suzuki et al. . |
| 5,237,409 | 8/1993 | Yamaguchi . |
| 5,467,110 | 11/1995 | White et al. ............. 345/199 |
| 5,473,736 | 12/1995 | Young ..................... 358/518 |

FOREIGN PATENT DOCUMENTS

| | | |
|---|---|---|
| 107072 | 9/1982 | European Pat. Off. . |
| 4107907 | 9/1992 | Germany . |
| 1513623 | 10/1989 | U.S.S.R. . |
| 1753596 | 8/1992 | U.S.S.R. . |
| 1781823 | 12/1992 | U.S.S.R. . |

OTHER PUBLICATIONS

Patent Abstract of Japan, vol. 16 No. 439 (P–1420), 14 Sep. 1992, JP4152386.
Patent Abstract of Japan, vol. 17 No. 711 (P–1668), 24 Dec. 1993, JP5242232.
N.N.: Kuck doch mal PC! In: Funkschau 13/1993, S.30–32.

(List continued on next page.)

*Primary Examiner*—Phuoc Tran
*Attorney, Agent, or Firm*—Quarles & Brady

[57] ABSTRACT

The invention refers to a method and an apparatus for generating compressed colored video scenes. In conventional methods and apparatus of this kind the problem arises that a large number of color values is present for each scene. The large number of color values should be reduced such that a pleasant image appears for the viewer. In order to obtain this a RGB color space is spanned wherein all color values of all pixels of all individual images of one video scene are inserted. The RGB color space is divided in 256 color rectangular parallel epipeds, each color parallel epiped containing either the same number of pixels or the same number of color values. All color values in one color rectangular parallel epiped are replaced by a mean color value for this color rectangular parallel epiped. Using these mean color values the individual images of a scene are represented such that with the exception of the first image only a differential image to the previously shown image is generated, only such pixels being unequal 0 the difference thereof exceeding a predetermined threshold value. A data compression of the differential images is carried out. The compressed data are stored in a data memory. During reproduction the data are decompressed and reproduced on a screen under a clock control.

13 Claims, 2 Drawing Sheets

5,825,918
Page 2

OTHER PUBLICATIONS

Abstract of U.S. Patent No. 5,307,143.
Abstract of U.S. Patent No. 5,298,992.
Abstract of U.S. Patent No. 5,287,420.
Abstract of U.S. Patent No. 5,272,529.
Abstract of U.S. Patent No. 5,237,397.
Abstract of U.S. Patent No. 5,235,680.
Abstract of U.S. Patent No. 5,233,411.
Abstract of U.S. Patent No. 5,231,487.
Abstract of U.S. Patent No. 5,225,904.
Abstract of U.S. Patent No. 5,215,095.
Abstract of U.S. Patent No. 5,208,857.
Abstract of U.S. Patent No. 5,191,645.
Abstract of U.S. Patent No. 5,164,819.
Abstract of U.S. Patent No. 5,138,459.
Abstract of U.S. Patent No. 5,103,306.
Abstract of U.S. Patent No. 5,095,301.
Abstract of U.S. Patent No. 5,058,174.
Abstract of U.S. Patent No. 5,047,853.
Abstract of U.S. Patent No. 5,046,119.
Abstract of U.S. Patent No. 5,027,222.
Abstract of U.S. Patent No. 4,970,663.
Abstract of U.S. Patent No. 4,953,196.
Abstract of U.S. Patent No. 4,953,168.
Abstract of U.S. Patent No. 4,952,149.
Abstract of U.S. Patent No. 4,918,523.
Abstract of U.S. Patent No. 4,914,508.
Abstract of U.S. Patent No. 4,910,586.
Abstract of U.S. Patent No. 4,907,081.
Abstract of U.S. Patent No. 4,901,139.
Abstract of U.S. Patent No. 4,857,993.
Abstract of U.S. Patent No. 4,857,992.
Abstract of U.S. Patent No. 4,857,991.
Abstract of U.S. Patent No. 4,847,677.
Abstract of U.S. Patent No. 4,835,601.
Abstract of U.S. Patent No. 4,833,528.
Abstract of U.S. Patent No. 4,799,677.
Abstract of U.S. Patent No. 4,743,959.
Abstract of U.S. Patent No. 4,688,246.
Abstract of U.S. Patent No. 4,661,862.
Abstract of U.S. Patent No. 4,628,356.
Abstract of U.S. Patent No. 4,608,456.
Abstract of U.S. Patent No. 4,586,036.
Abstract of U.S. Patent No. 4,580,134.
Abstract of U.S. Patent No. 4,394,774.
Abstract of U.S. Patent No. 4,392,159.
Abstract of U.S. Patent No. 4,347,618.
Abstract of U.S. Patent No. 5,053,857.
Abstract of U.S. Patent No. 4,691,352.
Abstract of U.S. Patent No. 4,163,249.
Abstract of U.S. Patent No. 5,299,300.
Abstract of U.S. Patent No. 5,283,670.
Abstract of U.S. Patent No. 5,255,083.
Abstract of U.S. Patent No. 5,241,372.
Abstract of U.S. Patent No. 5,216,476.
Abstract of U.S. Patent No. 5,194,008.
Abstract of U.S. Patent No. 5,179,449.
Abstract of U.S. Patent No. 5,111,295.
Abstract of U.S. Patent No. 5,111,285.
Abstract of U.S. Patent No. 5,053,956.
Abstract of U.S. Patent No. 5,045,937.
Abstract of U.S. Patent No. 5,028,950.
Abstract of U.S. Patent No. 5,025,400.
Abstract of U.S. Patent No. 4,999,709.
Abstract of U.S. Patent No. 4,962,425.
Abstract of U.S. Patent No. 4,949,725.
Abstract of U.S. Patent No. 4,935,809.
Abstract of U.S. Patent No. 4,893,182.
Abstract of U.S. Patent No. 4,890,833.
Abstract of U.S. Patent No. 4,876,651.
Abstract of U.S. Patent No. 4,811,245.
Abstract of U.S. Patent No. 4,811,088.
Abstract of U.S. Patent No. 4,811,084.
Abstract of U.S. Patent No. 4,766,541.
Abstract of U.S. Patent No. 4,714,428.
Abstract of U.S. Patent No. 4,698,664.
Abstract of U.S. Patent No. 4,697,209.
Abstract of U.S. Patent No. 4,689,681.
Abstract of U.S. Patent No. 4,688,105.
Abstract of U.S. Patent No. 4,683,490.
Abstract of U.S. Patent No. 4,616,217.
Abstract of U.S. Patent No. 4,310,848.
Abstract of U.S. Patent No. 4,302,775.
Abstract of U.S. Patent No. 4,223,454.
Abstract of U.S. Patent No. 4,172,524.
Abstract of U.S. Patent No. 4,150,825.
Abstract of U.S. Patent No. 3,683,106.
Abstract of U.S. Patent No. 3,617,626.
Abstract of U.S. Patent No. 5,305,438.
Abstract of U.S. Patent No. 5,294,974.
Abstract of U.S. Patent No. 5,293,229.
Abstract of U.S. Patent No. 5,289,276.
Abstract of U.S. Patent No. 5,278,647.
Abstract of U.S. Patent No. 5,270,813.
Abstract of U.S. Patent No. 5,253,056.
Abstract of U.S. Patent No. 5,253,053.
Abstract of U.S. Patent No. 5,247,363.
Abstract of U.S. Patent No. 5,231,486.
Abstract of U.S. Patent No. 5,231,484.
Abstract of U.S. Patent No. 5,214,507.

METHOD AND APPARATUS FOR GENERATING AND REPRODUCING OF COMPRESSED COLORED VIDEO SCENES

The present invention relates to a method for generating a compressed coloured video scene from a coloured original scene and to an apparatus for generating a compressed coloured video scene from a coloured original scene and for reproducing the compressed coloured video scene.

Conventionally, video scenes are recorded on video tapes and reproduced by special video recorders on the screen of a television apparatus or similar. There is the desire to be able to use the screen of a personal computer (PC) for reproducing video scenes and to store the video scenes digitally in a PC.

However, thereby the following problems arise, if a colour representation should be used. Conventionally, in a true colour method one bit is used for each colour so that $2^{24}$, i.e. about 16 million colours are present. This large number of colours must be reduced so that the PC can handle them. Conventionally, this takes place by giving a so-called standard colour palette including a certain number of colour values and to which the individual pixels of each single image, also called frame, are adjusted. According to another embodiment a so-called median-cut-algorithm is used which adjusts often used colours but which does not take care of details.

Furthermore, a single image may easily consist of 576 rows and 720 columns so that each individual image comprises a very large number of pixels. Therefore, the individual images cannot be stored pixel by pixel, however they must be compressed. Conventionally, this takes place in that a suitable transformation of pixel groups is carried out. A common transformation is the so-called DCT (Discrete Cosine Transform) wherein pixel groups of e.g. 8×8=64 pixels are described by Cosine-basic frequences. Simultaneously a quantification ignoring certain values and a so-called Huffmann-coding compressing according to statistical point of views are carried out. According to a different embodiment a differential image calculation is carried out wherein the deviation between two images are stored after a running time length compression method. In the first method additional hardware has to be employed for accelerating the method, in the second case very large data memories are necessary.

Furthermore, during the transition of one take to another take (in the following a take will also be called scene) large deviation may occur in the colour palette so that the colour values are not adjusted during a scene change.

Finally, PC operation systems typically supply a clock of a minimum of $\frac{1}{18.2}$ s. Therefore, software video players generally do not use a clock and output the individual images as quickly as possible. An assignment with audio data being provided separately is very complicated. Therefore the movement of the lips of the actors do not coincide with the reproduced language. The running pictures are adapted to the sound in a jerking manner.

In EP 0 107 072 A2 a method for generating coloured video scenes is described wherein a non-linear transformation of the RGB representation is carried out for each scanned pixel element. By means of a lookup table, the division of the RGB colour space is carried out for each image. A common code word is calculated from the thus obtained three code words. From JP-4 152 386 A it can be taken that the total colour space is divided into a limited number of regions by a division means. Colors of the colour space wherein the colour distribution is fine are divided finely, and parts of the colour space wherein the colour distribution is coarse are divided coarsely. A mean is calculated for each region. Therefore, it is the object of the invention to provide a method and an apparatus for generating and reproducing compressed coloured video scenes wherein a quick, clean colour storage and a quick, clean colour and jerk-free reproduction is possible.

This object is solved by a method with the features of the claimed invention as well as by an apparatus with the features according to the claimed invention.

Preferred developments of the method can be taken from the corresponding subclaims.

Figure 2:
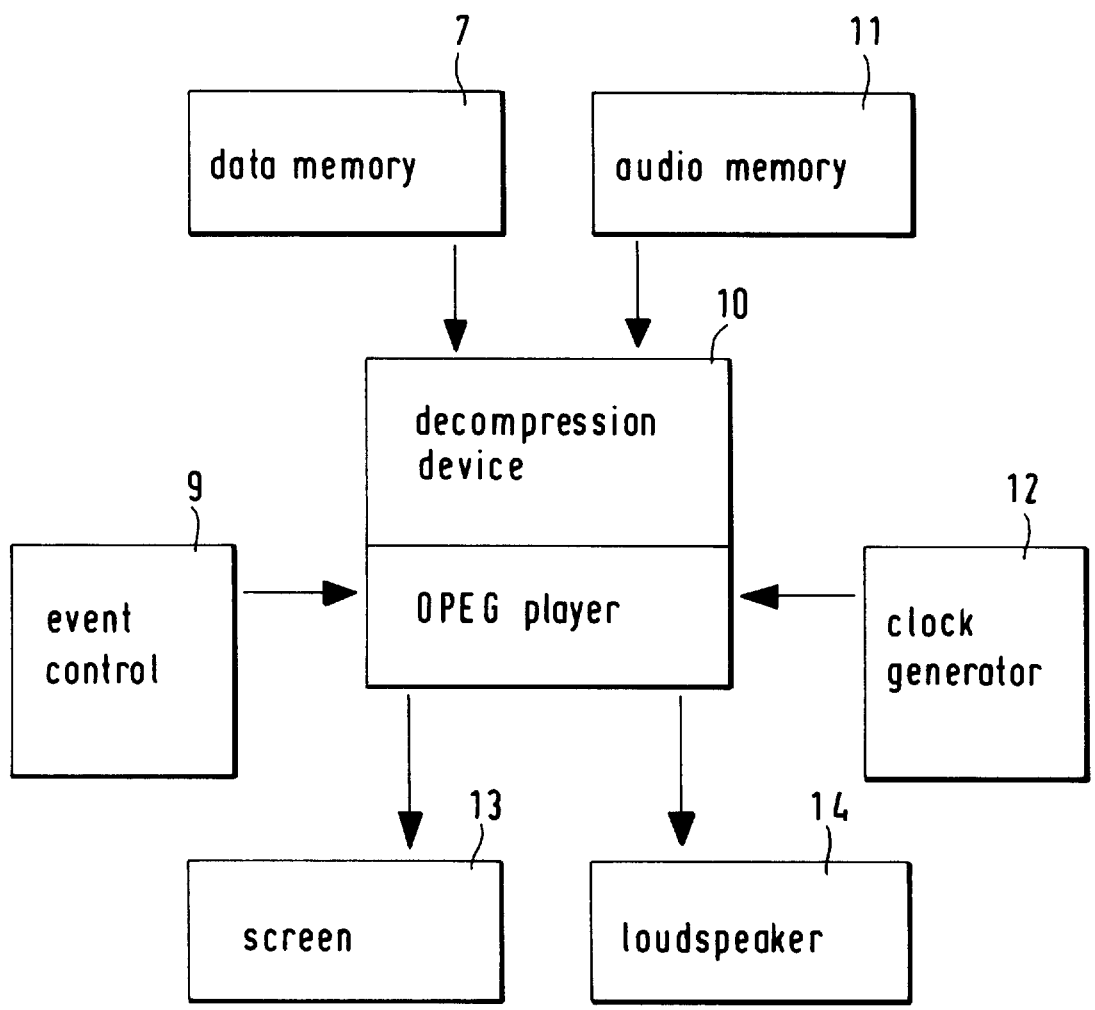

Further features and advantages of the invention follow from the description of embodiments in connection with the figures. From the figures show:

FIG. 1 schematically a portion of an embodiment of the inventive apparatus for generating a compressed coloured video scene; and FIG. 2 schematically a portion of an embodiment of the inventive apparatus for reproducing compressed coloured video scenes.

As is shown in FIG. 1 a so-called QPEG grabber 1 is provided representing an embodiment of a conventional frame grabber. The QPEG grabber 1 is connected with a video reproduction apparatus 2, the QPEG grabber 1 controls the video reproduction apparatus 2 and receives data, namely single images, also called frames from the video reproduction apparatus 2. The QPEG grabber 1 controls forward/backward run, searching an individual image adjustment of the video reproduction apparatus 2. The QPEG grabber 1 stores the individual images of a selected scene in a data memory 3. Preferably the data memory 3 is installed on the fixed disk of a PC.

A QPEG colour optimizer 4 being an embodiment of a colour compressor analyzes the colours present in a full scene, up to $2^{24}$ (about 16 million) different colour values may occur, if three colours (red, green and blue) are selected and if each colour is represented by one bit (8 bits).

The QPEG colour optimizer 4 determines a suitable "colour palette" wherein all pixels of a total scene are registered in a three-dimensional red-green-blue-colour space (RGB-colour space). The RGB-colour space is divided in two different ways into 256 colour rectangular parallel epipeds. In the first ways of dividing each colour rectangular parallel epiped receives the same number of pixels. This division represents the total colour impression relatively well. In the second way of division each colour rectangular parallel epiped receives the same number of colours. In this case the multitude of colours is best represented. By the first and second way of division of the three-dimensional RGB colour space 512 colour rectangular parallel epipeds result. To each colour rectangular parallel epiped a mean colour value is assigned. The weighted means for the colours in a rectangular parallel epiped are calculated such that the weighting is carried out in rectangular parallel epipeds of the first kind according to the pixel sum for each colour, while in rectangular parallel epipeds of the second kind a weighting occurs according to the used colours and not according to the frequency of the use. In this manner 256 colour values of the first kind and 256 colour values of the second kind, namely 512 colour values, are derived.

Now, from the remaining colour values those two are determined having the smallest colour distance. This distance $d_{ij}$ is calculated according to the following formula:

$$d_{ij}(P_i P_j) = <(R_i - R_j)^2 + (G_i - G_j)^2 + (B_i - B_j)^2,$$

R, G and B representing the red, green and blue portions. The two colour values with smallest distance from each other are replaced by their mean colour value. Thus the number of remaining colour values is reduced by one.

This method is repeated until only 256 colour values are left.

Out of the colour values originally present in the tree-dimensional RGB colour space 32 colour values are determined having the largest distance to the derived 256 colour values. These colour values are added to the derived 256 colour values. The 238 colour values such derived are further reduced by combining two colour values having the smallest distance to each other by a mean colour value. This is continued until only 236 colour values remain. Thereby 20 of the 256 representable colour value are available for arbitrary video independent representations.

This procedure has the advantage that image elements small in area are taken into account sufficiently and that the total distribution of the colours is represented by the derived colour palette.

A QPEG-image converter 5 uses the colour palette derived such to assign to the pixels of the individual images one of the 256 colour values. It is not necessary to represent the colour values of the pixels by one 24 bit-RGB colour value, however a 8 bit-index is sufficient which can address a suitable RGB value in the derived colour palette.

The QPEG-image converter 5 further serves for equalizing individual images as far as necessary. The QPEG grapper 1 not always, transmits the individual images or pixels in a height/width-ratio of 1:1. This distortion can be equalized by the QPEG image converter 5. Furthermore, the QPEG image converter 5 can carry out a reduction of the adjustable target size, e.g. from 576 rows and 720 columns to 288 rows and 360 columns.

A QPEG-delta-compression device 6 compresses the individual images generated by the QPEG image converter 5 with reduced colour value representation. The QPEG-delta-compression device 6 simulates a course of the scene based of threshold values for significant brightness and colour value variations. Namely each video scene is represented by a complete start image followed by differential images until the scene end is reached. In calculating the differential images only pixels are taken into account the variation thereof exceeding a threshold value for the brightness and colour value difference.

The examination of the colour value variation of the pixels takes place based on the image which would be seen by the viewer during reproduction compared with the image which is to be seen as next. Because of this reason during the differential image calculation the reproduction course has to be carried out with the simplification done and known during the threshold value examination. Therefore it is guaranteed that each shown image does not deviate more from the original than is provided by the threshold value. If only successive images without observation of the actual course of events are observed small and continuous pixel variations which are below the threshold values in consecutive images, however are above the threshold after several images would not show up. Therefore soft image transitions would be falsified. This makes it possible to calculate differential images which include less data but carry the full information.

Thereafter the QPEG delta compression device carries out a delta compression of the differential images. This is a conversion into the operations of a virtual compression/decompression machine. The operations include a variably long operation code (1, 2, 3 bits) and an operand portion (7, 6, 5 bits) used up to the next bit limit. The coding is assigned in view of the Huffmann-coding and the fast decoding (often occurring operations have a ½ bit code, rare ones a 3 bit code). The operation starts at a bit limit.

The thus derived compressed differential images representing a compressed coloured video scene are stored thereafter in a data memory 7.

According to a different embodiment the differential images are generated wherein the colour optimizer 4 has not previously reduced the three-dimensional RGB colour space from about 16 million colour values to 236 colour values. The QPEG delta compression device forms the differential images from the untreated individual images. I.e., the true colour individual images are used. Thereafter again the compression is carried out. In this embodiment all true colours are maintained so that in a possible reproduction not only 236 colour values are used, as they are suitable for the screen of a PC, but all originally present colour values are used so that a normal video reproduction is possible. Apart from the calculation of the differential images and apart from the compression of the differential images furthermore the colour palette can be calculated with the reduced colour values and the colour values for the differential images can be reduced by the colour palette.

According to a different embodiment the individual images output from the QPEG image converter 5 are not directly used to generate the differential images. The individual images output from the QPEG image converter 5 are smooth. A running means over three to five individual images is calculated for each corresponding pixel. The running means has the advantages effect that the noise is strongly reduced.

According to an even other embodiment, also colour palettes are calculated for a true colour representation in order to represent a pixel with only one bit instead of three (for the red, green and blue portion). For a view consecutive individual images a three-dimensional RGB colour space is established and a colour palette with 256 colour values is calculated as described above, this is used for the following individual images as long as the colour and brightness differences do not exceed a predetermined distance to the values of the colour palette. Then from a view individual images a colour palette with 256 colour values is calculated newly. From the colour palette used up to then colour values are deleted which are the least important ones in the following images to be converted. Those places which become empty are filled with the most important colours of the new colour palette. This procedure is repeated arbitrarily often, so that the most pixels can be represented by one bit although the number of used colours is larger than 256.

As was described above for each individual video scene (take) a colour palette is obtained, or a colour palette is obtained for a subscene. Therefore in the transition from one scene to the next scene individual images may follow each other which are represented by very different colour palettes. The conversion from one colour palette for the previous scene used for representing the last image to a colour palette for the following scene with which the first image is to be represented shows problems using graphic boards with a 256 colour representation. Image display and adjustment of the colour palette are processes which can be carried out only consecutively. If the adjustment of the colour palette for the following scene is caused when the last image is displayed, there is the consequence that the last image is seen with wrong colours of the colour palette for the following scene which is not suited. The transition from a previous scene with one colour palette for the previous scene to a following scene with a colour palette for the following scene is carried out with a first method such that in the last picture/-s of the scene the brightness of the colour palette for the previous scene is carried out by calculating the colour values in one or more steps to the values red=0, green=0, blue=0 (colour black). In this state each arbitrary image appears as a black rectangle. Now, the first image of the following scene is displayed. This can be seen also as a black rectangle. Thereafter the colour palette for the following scene is calculated with a first image/-s of the following scene in one or more steps from the brightness black to the original brightness of the colour palette for the following scene.

It is not always desired that two scenes are separated from each other by a more or less short fade out and fade up. Rather it is desired that two scenes run without transition steps so that the transformation of the colour palette is not detectable for the viewer.

Therefore, in a different embodiment each colour palette supplied by the colour optimizer 4 is obtained such that during re-production of scene transitions in a simple manner a transition colour palette with interleaved entries from both associated colour palettes can be used which makes it possible that the last image of the previous scene is displayed with half the number of colour values (118) as well as the first image of the following scene is displayed with half the number in an appropriate quality. The colours are arranged in the colour palette such that an even colour index indicates a colour which is as similar to a colour as possible which is indicated by a following odd colour index.

The colours are arranged in the colour palette according to pairs of similar colours. All conceivable sensible colour pairs of a colour palette 236×236/2−236=27612 are calculated This results into a triangle matrix with diagonal which is e.g. occupied in the upper right portion. Thereafter the point distance $d_{ij}$ ($P_i, P_j$ is calculated in the above-described manner. The colour pairs are ordered in increasing distance. A colour occupation vector is obtained, the number of components thereof being the same number (236) as the number of colour values in the colour palette. From the list of sorted colour pairs the colour pair with the smallest distance is taken. The two used colours are registered in the colour occupation vector. Then, the colour pair with the smallest next distance is taken and registered into the colour occupation vector as far as the two colours of the colour pair are not yet registered in the colour occupation vector. This is carried out until nearly all colours are registered into the colour occupation vector. Only the last colour pairs the colour difference of which being large to the other colour pairs are separated, and each colour is assigned the same colour as a partner.

If colour palettes exist for all scenes the colours thereof being similar in pairs, during reproduction of arbitrary consecutive scenes, the desired interleaved colour palette can be adjusted from the colour palettes of the previous and the following scenes at the transition position. By this procedure a pleasant smooth transition from one scene to the next scene is obtained.

As is shown in FIG. 2 the reproduction of compressed coloured video scenes is carried out by a so-called QPEG player 8. The QPEG player 8 is connected with a QPEG event control 9. The event control checks for each individual image to be reproduced according to a function delivered as a parameter whether an interesting event has occurred. If an interesting event has occurred, this is delivered to a reaction function for treatment. During a running video it can be caused e.g. that only the left sound in general can be heard, or a text is displayed, etc. It can be caused that the reproduction is stopped or broken off, or the video can be displayed faster or slower or backward, or it can be continued with a different scene.

The QPEG player 8 comprises a decompression device 10. The decompression device takes over the compressed coloured video scenes from the data memory 7 and carries out a decompression containing inverse operations as were carried out by the QPEG delta compression device 6.

Furthermore, the QPEG player 8 takes over data from an audio memory 11 wherein the audio signals belonging to the scenes are stored.

The QPEG player 8 is operated under the control of a QPEG clock generator 12. The QPEG clock generator 12 uses two of three generally present channels of a PC which are associated to a timing circuit. This refers to the BIOS clock, the RAM refresh portion and the sound generation for the PC loudspeakers. The BIOS clock is generally associated to channel 0. The loudspeaker is generally associated to channel 2.

The channel 2 is synchronized with the channel 0 since channel 2 itself is not interruptible.

Because of compressing it is possible to feed in at least 25 images per second from the data memory 7 into the QPEG player 8. A clock is generated wherein the states of the two channels 0 and 2 are synchronized to each other at a starting timing. The channel 0 used by the BIOS clock supplies 18,2 per second an interrupt. Its counter runs twice through the range of value 0 . . . 65535. In order to take the precise timing the channel 2 is started when the above interrupt occurs. Because a small offset cannot be avoided it runs with a difference delta parallel to channel 0. The counter of the channel 2 runs through the clock time $\frac{1}{18.2}$ seconds once the range of values 0 . . . 65535.

If corrections are applied for the differents delta and the read out of the two counters, the time can be taken with a precision of 0.1 msec. Thus, the clock generation $\frac{1}{25}$ sec is guaranteed for each image.

The individual images which are decompressed in the decompression device 10 and which are converted in images having the correct tact in the QPEG player are displayed on a screen 13, while the associated audio signals are output through a loudspeaker 14.

We claim:

1. A method for generating a compressed coloured video scene from a coloured original video scene having a total colour impression and a colour plurality, comprising the steps of:

a) entering of colour values of pixels of individual images of said original video scene into a three-dimensional colour space having dimensions being represented by colours;

b1) providing a first division of said three-dimensional colour space into a plurality of first colour rectangular parallel epipeds such that each colour parallel epiped contains the same number of pixels, and determining for each first colour parallel epiped a mean first colour value, reproducing in total said total colour impression of said original video scene;

b2) providing a second division of said three-dimensional colour space into a plurality of second colour parallel epipeds such that each second colour parallel epiped contains the same number of colours used in said video scene, and determining for each second colour parallel epiped a mean second colour value, reproducing in total said colour plurality of said original video scene;

c1) replacing said mean first and second colour value obtained in steps b1) and b2) having a smallest distance in said colour space by their mean value; and c2) repeating the step (c1) until a first desired number of mean colour values is obtained.

2. The method according to claim 1, wherein said step (c2) comprises the following steps:

(c3) determining a predetermined number of differing colour values in said three-dimensional colour space which show largest distances to other colour values;

(c4) adding said differing colour values to said first desired number of colour values; and (c5) repeating said step (c1) using the such obtained colour values until a second desired number of colour values is obtained.

3. The method according to claim 1, comprising the steps of:

(a1) dividing coloured original video scenes into a plurality of subscenes, and (a2) determining a three-dimensional colour space in step (a) for each subscene.

4. The method according to claim 3, comprising the steps of:

providing a threshold value;

determining for one individual image following to said subscene whether a difference between said colour values of the following individual image and said colour values associated in said steps (c1, c2) exceeds said threshold value; and establishing of 256 new colour values consisting of still necessary colours of said colour values associated in said steps (c1, c2) and containing such new colour values that it is prevented that said threshold value is exceeded.

5. The method according to claim 4, wherein colour values of a first individual image of said subscene are not taken into account, if said colour values of an already following individual image are included because of exceeding said threshold value.

6. A method for generating a compressed coloured video scene from a coloured original video scene having a total colour impression and a colour plurality, comprising the steps of:

(d) determining of two individual images of said original video scene following each other;

(e) determining of threshold values for a brightness and a colour value difference of said pixels of said two individual images following each other;

(f) determining a differential image for said two individual images following each other with differential pixels in response whether said threshold value for said brightness and colour value difference is exceeded; and (g) compressing said differential images, wherein in step (d) colour values are replaced by the following steps a) entering of colour values of pixels of individual images of said original video scene into a three-dimensional colour space having dimensions being represented by colours;

b1) providing a first division of said three-dimensional colour space into a plurality of first colour rectangular parallel epipeds such that each colour parallel epiped contains the same number of pixels, and determining for each first colour parallel epiped a first mean colour value, reproducing in total said total colour impression of said original video scene;

b2) providing a second division of said three-dimensional colour space into a plurality of second colour parallel epipeds such that each second colour parallel epiped contains the same number of colours used in said video scene, and determining for each second colour parallel epiped a mean second colour value, reproducing in total said colour plurality of said original video scene;

c1) replacing said mean first and second colour value obtained in steps b1) and b2) having a smallest distance in said colour space by their mean value; and c2) repeating the step (c1) until a first desired number of mean colour values is obtained.

7. The method according to claim 6, wherein after step (d) the following step is carried out:

(d1) determining a running means for said brightness and colour values for said pixels of said individual images, wherein said running means is taken over a predetermined number of individual images following each other.

8. The method according to claim 6, comprising the steps of:

(h) determining a last individual image of an original video scene and a first individual image of a following original video scene;

(i) ordering said colour values of said last individual image according to a colour similarity and ordering said colour values of said first individual image according to said colour similarity.

9. A method for reproducing of coloured video scenes compressed according to claim 6, comprising the steps of:

(j) decompressing said differential images;

(k) adding said differential images for retrial of said individual images; and (l) displaying said individual images on a screen.

10. The method according to claim 9, wherein the step (l) comprises the following steps:

(l1) generating a clock signal;

(l2) dividing of individual clocks of said clock signal into subclocks; and (l3) deriving a timing clock for controlling a reproduction of said individual images from said subclocks.

11. The method according to claim 9, wherein a predetermined number of said last individual images of a video scene is reproduced with half of said corresponding brightness and colour values, said missing brightness and colour values being taken from said first individual images of said following video scene.

12. The method according to claim 9, wherein said last image of a previous video scene and said first image of a following video scene are displayed with half the number of colour values, comprising the steps of:

(m) forming a transition colour palette from colour values having even index of a previous scene and of colour values with odd index of a following scene, (n) changing said pixels of said last image of said previous scene having an odd value to the next lower even value, (o) changing said pixels of said first image of said beginning scene having an even value to the next higher odd value;

(p) displaying said last image of said previous scene, (q) displaying said first image of said following scene, (r) adjusting said colour palette of said following scene, wherein the changes in the steps (m) to (o) may be executed reversely.

13. An apparatus for generating a compressed coloured video scene from a coloured original video scene having a total colour impression and a colour plurality and for reproducing a compressed coloured video scene, comprising:

(i) a digital or analog video source (2), (ii) a grabber means (1) for extracting of individual images from said video source (2) and storing said individual images in a data memory (3);

(iii) colour optimizing means (4) for collecting colour values of pixels of individual images in a coloured original video scene for dividing a three-dimensional colour space spent by said colour values into colour rectangular parallel epipeds and associating a mean colour value to each colour rectangular parallel epiped;

said colour optimizing means (4) including means for providing a first division of said three-dimensional colour space into a plurality of first colour rectangular parallel epipeds such that each colour parallel epiped contains the same number of pixels, and determining for each first colour parallel epiped a mean first colour value, reproducing in total said total colour impression of said original video scene;

said colour optimizing means (4) including means for providing a second division of said three-dimensional colour space into a plurality of second colour parallel epipeds such that each second colour parallel epiped contains the same number of colours used in said video scene, and determining for each second colour parallel epiped a mean second colour value, reproducing in total said colour plurality of said original video scene;

said colour optimizing means (4) including means for repeatedly replacing said mean first and second colour value having a smallest distance in said colour space by their mean value until a first desired number of mean colour values is obtained;

(iv) image transformation means (5) for generating of individual images with said colour values;

(v) compression means (6) for compressing said individual images and storing said compressed individual images;

(vi) decompression means (10) for retrieving said compressed individual images and for decompressing said individual images; and (vii) a clock generator for controlling said clock for reproducing said decompressed individual images.

\* \* \* \* \*